United States Patent Office 2,862,003
Patented Nov. 25, 1958

2,862,003

SYNTHESIS OF 4-AMINO-3-ISOXAZOLIDONES

Hans Kirchensteiner, Reinhard Schlapfer, and Hans Spiegelberg, Basel, Switzerland, assignors to Hoffmann-La Roche Inc., Nutley, N. J., a corporation of New Jersey No Drawing. Application November 28, 1956
Serial No. 624,722

Claims priority, application Switzerland December 2, 1955

6 Claims. (Cl. 260—307)

This invention relates to the production of 4-amino-3-isoxazolidone compounds. More particularly, the invention pertains to the synthesis of 4-amino-3-isoxazolidone compounds conforming to the following structural formula

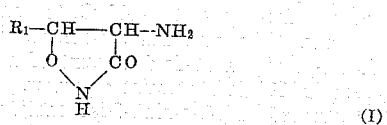

wherein $R_1$ represents hydrogen, alkyl, aryl or aralkyl.

Compounds having the Formula I above are produced according to this invention by treating a mixture of hydroxylamine and an ester having the general formula

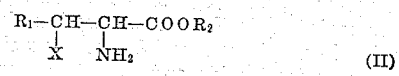

wherein $R_1$ represents hydrogen, alkyl, aryl or aralkyl, $R_2$ represents alkyl and X represents halogen with a strong base in the presence of water. Methods for isolating the end product are also within the scope of this invention.

In Formula II above, alkyl groups represented by $R_1$ and $R_2$ are preferably lower alkyl groups, for example, methyl, ethyl, propyl and isopropyl. Aryl groups represented by $R_1$ include unsubstituted and nuclear substituted monocyclic hydrocarbon radicals such as phenyl, p-tolyl, o-tolyl, xylyl, etc. Aralkyl groups represented by $R_1$ include monocyclic hydrocarbonaralkyl radicals such as benzyl, phenethyl, etc. X represents the halogen atoms chlorine, bromine, iodine or fluorine.

Illustrative of esters corresponding to Formula II above which are useful as starting materials are α-amino-β-chloropropionic acid methyl ester, α-amino-β-chlorobutyric acid methyl ester, α-amino-β-chloro-β-phenylpropionic acid ethyl ester, α-amino-β-bromo-γ-phenylbutyric acid methyl ester, α-amino-β-iodopropionic acid propyl ester, etc. The free esters corresponding to Formula II above or their salts, for example, mineral acid salts such as the hydrochloride, hydrobromide or sulfate, which permit easier handling may be used as starting material. The hydroxylamine may also be utilized in the form of an acid salt such as a fatty acid salt, e. g. the acetate, or such as a mineral acid salt, e. g. the hydrochloride or sulfate. When salts as described above are treated with a strong base according to this invention free hydroxylamine and free α-amino-β-halogen carbonic acid ester are produced initially, then the reaction of the latter occurs to form the desired product.

The starting materials may be produced, for example, by reaction of phosphorus pentachloride with the appropriate α-amino-β-hydroxy acid ester according to the method of E. Fischer, Berichte der Deutschen Chemischen Gesellschaft, 40, page 3719 (1907).

Strong bases which may be used in the process of this invention include inorganic bases such as alkali metal hydroxides, preferably sodium, potassium or lithium hydroxide, and organic aliphatic bases such as tri-lower alkylamines, preferably trimethylamine or triethylamine.

The starting materials are utilized in a proportion of about 3 to 4 mols of hydroxylamine to about 2 mols of ester. About 3 to 4 mols of base are used in the reaction. Temperatures in the range of about −5° to 60° C. are advantageous for carrying out the process.

According to a preferred modification of this invention, an inorganic base such as sodium, potassium or lithium hydroxide in aqueous solution is utilized as the basic agent. In order to separate the 4-amino-3-isoxazolidone product from the alkali metal salts resulting from the reaction, the alkaline reaction mixture is first acidified to a pH slightly less than 6 with a mineral acid, advantageously by means of hydrochloric acid. Then by means of an organic amine, e. g., a lower alkylamine such as methyl-, diethyl- or triethylamine, the reaction mixture is made alkaline to phenolphthalein. An aliphatic lower alkyl alcohol or ketone such as ethanol or acetone is introduced, whereby the halogen salt, which is only slightly soluble in the alcohol or ketone, precipitates out and may be separated while the soluble amine salt of the 4-amino-3-isoxazolidone compound remains in solution. The 4-amino-3-isoxazolidone compound may be isolated from this solution by adding acid and cooling to induce crystallization.

A second preferred modification for isolating the 4-amino-3-isoxazolidone compounds comprises freeing the 4-amino-3-isoxazolidone from its salt by the addition of acid to the alkaline reaction solution and pouring the solution into alcohol or acetone, whereby the 4-amino-3-isoxazolidone compound and the halogen salts separate out. To separate the 4-amino-3-isoxazolidone compound from the halogen salts, the mixture is suspended in alcohol or acetone and treated with an organic base such as diethylamine. This effects the separation of the halogen salts which are only slightly soluble in organic solvents. The addition of an acid, preferably glacial acetic acid, brings about the separation of the dissolved 4-amino-3-isoxazolidone compound.

A particularly preferred modification comprises using aqueous methanol as the solvent. This permits the isolation and separation of the 4-amino-3-isoxazolidone compounds from the inorganic salts and the precipitation of the salts from the organic solvent in a simple manner. One especially advantageous procedure for isolating and separating the 4-amino-3-isoxazolidone compounds from the halogen salts comprises adding an alcohol, especially ethanol, or the addition of a dehydrating agent which effects the precipitation of the salt and permits its separation. Then the 4-amino-3-isoxazolidone compound which is dissolved in the alkaline filtrate is freed from the alkali salt with an organic acid, preferably glacial acetic acid, and cooled to induce crystallization.

According to a further preferred modification of the invention an organic aliphatic base may be used as the basic agent, e. g. a tri-lower alkylamine such as triethylamine or trimethylamine. For this modification an aqueous aliphatic lower alkyl alcohol, for example, aqueous methanol or ethanol, is preferably used as the reaction medium. Since the hydrohalide salts of the above mentioned strong organic bases are alcohol soluble, it is not necessary to separately effect their separation from the reaction mixture before initiating the crystallization of the 4-amino-3-isoxazolidone compound.

The 4-amino-3-isoxazolidones may also be isolated by use of ion exchange means.

The products made according to this invention are useful as antibacterial agents and may be utilized in treating infections caused by organisms such as pneumococci,

*E. coli* and *S. schottmuelleri*. They are also useful in treating tuberculosis. Certain members of the class are in addition useful as sedatives. Therapeutic dosages in conventional forms may be administered orally.

Compounds utilized in this invention occur in optically active isomeric forms and racemic mixtures thereof. This invention may be applied to and encompasses within its scope all such embodiments.

*Example 1*

13.2 parts by weight of sodium hydroxide were dissolved in 60 parts by weight of water and were treated gradually with 7.1 parts by weight of hydroxylamine hydrochloride while stirring below 0° C. To the clear solution were added 17.4 parts by weight of DL-α-amino-β-chloropropionic acid methyl ester hydrochloride in small quantities so that the temperature did not exceed 0°. The solution was stirred for 15 minutes at 0°. The pH of the solution was adjusted to 6 with ethanolic hydrochloric acid. Approximately 11 parts by weight of triethylamine were added until the solution was alkaline to phenolphthalein, then 800 parts by volume of ethanol were added. After standing for a short time in the cold, sodium chloride precipitated and was separated by filtration. The alcoholic filtrate was adjusted to pH 6.2 with ethanolic hydrochloric acid and left to crystallize overnight in a refrigerator. The crystalline material was filtered and washed with absolute alcohol, then recrystallized from 2½ volumes of water and 15 to 20 volumes of ethanol to obtain DL-4-amino-3-isoxazolidone, M. P. 142° C. (with dec.).

*Example 2*

70.4 parts by weight of sodium hydroxide were dissolved in 400 parts by volume of water and cooled to about 5° C. Then 39.2 parts by weight of hydroxylamine hydrochloride were introduced in small portions so that the temperature did not exceed 10° C. Then 69.6 parts by weight of DL-α-amino-β-chloropropionic acid methyl ester hydrochloride were introduced in small amounts and the mixture was let stand for 3½ hours while stirring and cooling with ice. The mixture was then warmed to 60° C. for 12 minutes, cooled immediately with ice and the solution was then concentrated to about 275 parts by volume in an evaporator. By the addition of ethanolic hydrochloric acid the pH was adjusted to 6.2. 4000 parts by volume of ethanol were added while stirring whereupon there precipitated a mixture of halogen salts and DL-4-amino-3-isoxazolidone. The mixture was permitted to stand for 20 hours in the refrigerator, then was filtered by suction and dried.

The DL-4-amino-3-isoxazolidone was separated from the halogen salts by finely pulverizing the dry mixture obtained above and warming at 60° C. in a mixture of 4100 parts by volume of absolute alcohol, 41 parts by weight of water and 68 parts by weight of diethylamine for 15 minutes. The precipitate which formed was then filtered off, the filtrate was cooled to about 5°, treated with 40 parts by weight of animal charcoal, and filtered. While stirring and cooling with ice, enough glacial acetic acid was added to the filtrate until a water diluted sample showed a pH of 4.8 to 5.0, whereupon DL-4-amino-3-isoxazolidone separated in pure form. After standing 20 hours in the refrigerator, the mixture was filtered by suction and the residue on the filter was dried to obtain pure DL-4-amino-3-isoxazolidone, M. P. 140–142° C.

*Example 3*

Into a mixture of 49 parts by volume of 30% sodium hydroxide, 80 parts by volume of water and 40 parts by volume of ice there were introduced portionwise 10 parts by weight of hydroxylamine hydrochloride and then (while cooling) 17.4 parts by weight of DL-α-amino-β-chloropropionic acid methyl ester hydrochloride at a rate so that the temperature did not exceed 0°. After the introduction of the reactants, the mixture was stirred for 1½ hours while cooling with ice, then warmed for 15 minutes at 45° C. and again cooled. The DL-4-amino-3-isoxazolidone was isolated from the alkaline reaction solution by the procedure described in Example 2.

*Example 4*

DL-4-amino-3-isoxazolidone produced as described in example 3 was also obtained in crystalline form through the use of Amberlite IRA 400 ion exchange resin. According to this modification, the reaction solution was buffered to pH 7 with acetic acid while cooling and passed over a cation exchange resin. The resin was washed acid free with water and the DL-4-amino-3-isoxazolidone was eluted with 0.5 N ammonia. The slightly yellow ammonia solution which was obtained was decolorized with carbon and concentrated in vacuo at 35° to 60 parts by volume. The pH was adjusted to 6.2 with 15% hydrochloric acid and about 300 parts by volume of absolute alcohol were added. The mixture was then kept at −10° C. to permit crystallization to occur. The crystalline material was separated and triturated with a 10-fold amount of methanol, then dissolved in 2½-fold amount of water. Crystallization of the purified DL-4-amino-3-isoxazolidone was initiated by the careful addition of ethanol in the cold.

*Example 5*

17.6 parts by weight of sodium hydroxide were dissolved in 70 parts by volume of water and the solution was cooled to 5° C. There were introduced into the solution in small portions 9.8 parts by weight of hydroxylamine hydrochloride and then 17.4 parts by weight of L-α-amino-β-chloropropionic acid methyl ester hydrochloride so that the temperature did not exceed 10° C. The mixture was cooled for 3 hours while cooling with ice. It was then warmed for 12 minutes at 60° C., cooled to about 5° C. and the pH was then adjusted to 6.2 with alcoholic hydrochloric acid. While stirring and cooling with ice, the mixture was treated with 2000 parts by volume of alcohol and permitted to stand for 6 hours. The precipitated mixture of sodium chloride and L-4-amino-3-isoxazolidone was separated by filtering under suction. This residue was finely pulverized and was warmed in a mixture of 400 parts by volume of alcohol, 2 parts by volume of water and 6.7 parts by weight of diethylamine for 15 minutes at 60° C. with stirring. The precipitated sodium chloride was separated by filtration and the clear solution was cooled to about 5° C. Glacial acetic acid was added while stirring and cooling with ice until a sample diluted with water showed a pH of about 4.8 to 5.0, whereupon L-4-amino-3-isoxazolidone began to crystallize. After 4 hours pure L-4-amino-3-isoxazolidone was separated by filtering under suction, M. P. 156° C., $[\alpha]_D^{22} = -115°$ (C.=1.0 in water).

*Example 6*

35 parts by weight of sodium hydroxide were dissolved in 75 parts by volume of water and cooled to −5° C. 20 parts by weight of hydroxylamine hydrochloride and 34.8 parts by weight of D-α-amino-β-chloropropionic acid methyl ester hydrochloride were introduced portionwise at −3° C. The mixture was stirred for an hour at 0° C. and then warmed for an additional hour at 25–28° C. The mixture was then cooled to −10° C. and acidified to a pH of 5.6 with alcoholic hydrochloric acid. It was then poured into an ice cold solution of 40 parts by weight of diethylamine in 100 parts by volume of ethanol. The diethylamine-alkali solution was poured into 1100 parts by volume of ethanol at 60° C., held at this temperature for about 10 to 15 minutes, then cooled to −5 to −10° C. and then filtered from the sodium chloride. The clear filtrate was adjusted to a pH of 6 at −12° C. with about 23 parts by weight of glacial acetic acid and then seeded with D-4-amino-3-isoxazolidone. The mixture was permitted to crystallize at −18° C. with occasional stirring. The crude D-4-amino-3-isoxazolidone crystals were filtered under suction and purified by means of the acid tartrate, M. P. 140° C., $[\alpha]_D^{22} = +114.5–115°$ (C=1 in water).

Example 7

87.5 parts by weight of sodium hydroxide and 0.5 part by weight of sodium sulfide were mixed with 35 parts by volume of water. After the major portion of the sodium hydroxide went into solution, 350 parts by volume of methanol were added and the mixture was held at approximately 50° C. until the solution became clear. The solution was then cooled to −9 to −10° C. and was held at this temperature under intensive stirring while a warm solution (30° C.) of 50 parts by weight of hydroxylamine hydrochloride, 15 parts by volume of water and 150 parts by volume of methanol were run in. Then a solution of 87 parts by weight of DL-chloroserine methyl ester hydrochloride in 125 parts by volume of methanol was dropped in at −10° C. with continuous stirring and the mixture was stirred for an additional hour.

In order to separate the inorganic salts, the mixture was stirred for 3 hours with 60 parts by weight of sodium sulfate at −15° C., the inorganic salts were separated and the salt was washed with methanol. The pH of the combined filtrates was adjusted to 6 with glacial acetic acid in the cold. It was seeded with DL-4-amino-3-isoxazolidone at −10° to −15° C. and the crystallization was completed after about 3 to 4 hours. The crude DL-4-amino-3-isoxazolidone was separated and purified by the addition of sodium acetate and the formation of the diethanolamine salt, M. P. 140–141° C.

Example 8

A solution containing 38 parts by weight of DL-4-amino-3-isoxazolidone, obtained as in Example 7, was mixed with 700 parts by volume of ethanol at −10 to −15° C. for 30 to 45 minutes. The precipitated sodium chloride was washed out with a small amount of methanol and filtered. The filtrate was adjusted in the cold with acetic acid to a pH of 6.0 to 6.05. The crystalline DL-4-amino-3-isoxazolidone was isolated as described in Example 7.

Example 9

35 parts by weight of sodium hydroxide were dissolved in 75 parts by volume of water and the solution was cooled to −5° C. 20 parts by weight of hydroxylamine hydrochloride and then 37.6 parts by weight of DL-threo-α-amino-β-chloro butyric acid methyl ester hydrochloride were introduced portionwise at −3° C. [DL-threo-α-amino-β-chloro butyric acid methyl ester hydrochloride, M. P. 159–161° C., was prepared by chlorinating DL-allo-threonine methyl ester hydrochloride, M. P. 144–145° C., with phosphorus pentachloride according to the method of Kinoshita et al., C. A., 46, 3005 (1952)]. The mixture was stirred for 3 hours at 0° C. and then warmed for an additional hour at 25–28° C. After cooling to −10° C., the mixture was acidified with alcoholic hydrochloric acid to a pH 5.6 and 40.2 parts by weight of diethylamine cooled to 0° C. were added. The diethylamine-alkali solution was poured into 800 parts by volume of ethanol at 60° C., held at this temperature for 10–15 minutes. It was then cooled to 0 to +2° C. and separated from precipitated sodium chloride. The clear filtrate was adjusted to pH 6.0 with glacial acetic acid at 0° C. and permitted to crystallize overnight at −10° C. The crystals were separated by filtering under suction. The crude DL-allo-5-methyl-4-amino-3-isoxazolidone was purified by reprecipitation by means of diethylamine and glacial acetic acid in aqueous alcohol. The compound displayed the following characteristics: no definite melting point, decomposing between 160–170° C.; paper chromatography (Schleicher-Schüll Paper No. 2043 b, descending): solvent: isopropanol-conc. $NH_4OH$—$H_2O$, 80:2:18, $R_f=0.27$, identification with ninhydrin; U. V. absorption: λ max.=224 mμ, E=4200, in water.

Example 10

35 parts by weight of sodium hydroxide were dissolved in 75 parts by volume of water and the solution was cooled to −5° C. 20 parts by weight of hydroxylamine hydrochloride and then 37.6 parts by weight of DL-allo-α-amino-β-chloro butyric acid methyl ester hydrochloride were introduced portionwise below −3° C. [DL-allo-α-amino-β-chloro butyric acid methyl ester hydrochloride, M. P. 167–169° C., with dec., was prepared by chlorinating DL-threo-threonine methyl ester hydrochloride, M. P. 122–124° C., with dec., with phosphorus pentachloride according to the method of Kinoshita et al., C. A., 46, 3005 (1952)]. The mixture was stirred for one hour at 0° C. and then warmed for an additional hour at 25–28° C. After cooling to −10° C., the mixture was acidified to pH 5.6 with alcoholic hydrochloric acid. 40.2 parts by weight of diethylamine, cooled to 0° C., were added. The diethylamine-alkali solution was poured into 800 parts by volume of ethanol at 60° C., held at this temperature for 10–15 minutes, cooled to 0 to +2° C. and separated from precipitated sodium chloride. The clear filtrate was adjusted to pH 6.0 at 0° C. with glacial acetic acid and permitted to crystallize overnight at −10° C. The crystals were separated by filtering under suction. The crude DL-threo-5-methyl-4-amino-3-isoxazolidone thus obtained was recrystallized from water-alcohol and showed the following characteristics: no definite melting point, but decomposed between 280 and 300° C.; paper chromatography: same conditions as in Example 9, $R_f=0.22$; U. V. absorption: λ max.=226 mμ, E=3820, in water.

We claim:

1. A process for the production of 4-amino-3-isoxazolidone compounds which comprises reacting a mixture comprising hydroxylamine and an ester having the formula

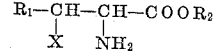

wherein $R_1$ represents a member of the group consisting of hydrogen, alkyl, aryl and aralkyl, $R_2$ represents alkyl and X represents halogen with a strong base in the presence of water.

2. A process according to claim 1 wherein a salt of hydroxylamine and a salt of the ester are used as starting materials.

3. A process which comprises reacting hydroxylamine and α-amino-β-chloropropionic acid methyl ester with a strong base in aqueous medium.

4. A process as in claim 3 wherein the strong base is alkali metal hydroxide.

5. A process which comprises reacting a mixture comprising hydroxylamine and an ester having the formula

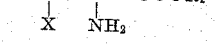

wherein $R_1$ represents a member of the group consisting of hydrogen, alkyl, aryl and aralkyl, $R_2$ represents alkyl and X represents halogen with a strong base in the presence of water, acidifying the alkaline reaction solution obtained with a mineral acid to a pH slightly below 6, adjusting the solution so as to react alkaline to phenolphthalein by the addition of a lower alkylamine, introducing the solution into a member of the group consisting of aliphatic lower alkyl alcohols and ketones, separating the precipitated halogen salts, acidifying and cooling the solution remaining and isolating the 4-amino-3-isoxazolidone compound which crystallizes.

6. A process which comprises reacting a mixture comprising hydroxylamine and an ester having the formula

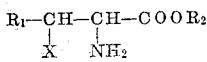

wherein $R_1$ represents a member of the group consisting of hydrogen, alkyl, aryl and aralkyl, $R_2$ represents alkyl and X represents halogen with a strong base in the presence of water, acidifying the alkaline reaction solution obtained with a mineral acid, introducing the acid solution into a member of the group consisting of aliphatic lower alkyl alcohols and ketones, separating the crystalline precipitate and suspending it in an aliphatic lower alkyl alcohol, adding a lower alkylamine and separating the precipitate which forms, acidifying and cooling the solution remaining and isolating the 4-amino-3-isoxazolidone compound which crystallizes.

References Cited in the file of this patent

UNITED STATES PATENTS

| | | |
|---|---|---|
| 2,762,815 | Pohland | Sept. 11, 1956 |
| 2,772,280 | Peck et al. | Nov. 27, 1956 |
| 2,772,281 | Holly et al. | Nov. 27, 1956 |
| 2,773,878 | Shull et al. | Dec. 11, 1956 |

FOREIGN PATENTS

| | | |
|---|---|---|
| 522,726 | Canada | Mar. 13, 1956 |

OTHER REFERENCES

Kuehl et al.: J. Am. Chem. Soc., vol. 77, pages 2344–7 (1955).